United States Patent Office 3,074,973
Patented Jan. 22, 1963

---

3,074,973
4,5-EPOXYPENTYL 4,5-EPOXYPENTANOATE AND PROCESS FOR ITS PREPARATION
Benjamin Phillips and Frederick C. Frostick, Jr., Charleston, W. Va., assignors to Union Carbide Corporation, a corporation of New York
No Drawing. Filed Sept. 5, 1958, Ser. No. 759,133
1 Claim. (Cl. 260—348)

This invention relates in general to a novel diepoxide and more particularly to 4,5-epoxypentyl 4,5-epoxypentanoate and the process for its preparation.

Organic compounds containing more than one epoxy group are valuable in several ways throughout industry. These epoxy compounds are useful as solvents, plasticizers and as intermediates in the synthesis of organic chemicals. For example, they can be polymerized or copolymerized through the epoxy group with proper catalysts, or used as modifiers for synthetic condensation resins and as stabilizers for vinyl type resin compositions.

The structure of 4,5-epoxypentyl 4,5-epoxypentanoate is especially desirable for its use as a condensation monomer. The absence of branched chains, together with the terminal position of the two epoxy groups, make this compound attractive for use when flexibility in a polymer is desired. Additionally, the epoxide groups are reactive with alcohols, anhydrides, carboxylic acids, aldehydes and similar compounds containing active groups. This monomer can be condensed with these and other reactive groups in the presence of either acids or basic catalysts as well as in neutral solutions. Polymerization of the diepoxide either by itself or with other epoxides can be effected when catalyzed by acids, bases or heat.

While other epoxides are known which have value as monomers for resins, their structure is generally quite different from 4,5-epoxypentyl 4,5-epoxypentanoate. For example, many diepoxides are known which are formed by the reaction of epichlorohydrin and bisphenols. Since these monomers usually contain one or more phenylene groups and two or more glycidyl groups, polymers prepared from such compounds are usually hard and rigid due to cross-linking. Other diepoxide monomers are prepared by epoxidation of the product of the Tischenko reaction of 3-cyclohexenecarboxyaldehydes. These compounds are relatively inert towards basic catalysts but quite reactive with acidic catalysts. Diepoxides have similarly been prepared such as the glycidyl esters, glycidic esters, glycidyl ethers or epoxystearates. However, none of these diepoxide compounds are structurally similar to the compound of this invention, 4,5-epoxypentyl 4,5-epoxypentanoate, and usually possess epoxide groups which are of different reactivity.

4,5-epoxypentyl 4,5-epoxypentanoate can be synthesized from relatively inexpensive and easily accessible starting materials with each step in the synthesis producing the intermediate product in high yield. While several of the higher homologs of 4,5-epoxypentyl 4,5-epoxypentanoate are known, none exhibit the unique characteristics attributable to this compound. 4,5-epoxypentyl 4,5-epoxypentanoate is valuable as a reactive diluent or viscosity reducer for certain resins. For example, it was found that 4,5-epoxypentyl 4,5-epoxypentanoate reduces the viscosity of the diglycidyl ethers of diphenylolpropanes such as the diglycidyl ether of 2,2-bis(hydroxyphenyl)propane, whereas the higher isomeric homologs such as 9,10-epoxystearyl-9,10-epoxystearate are of no value as a reactive viscosity reducer.

The compound of this invention is synthesized from 4-pentenal by a two step reaction:

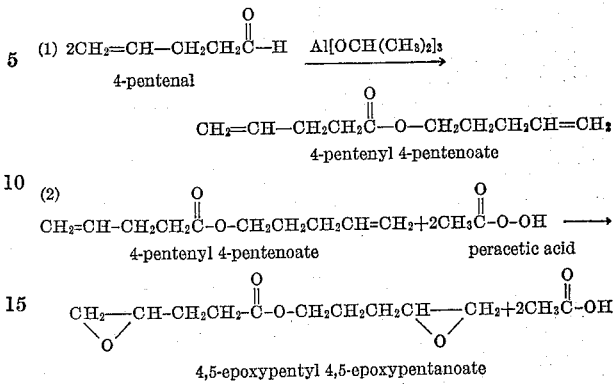

In the first step, the 4-pentenal undergoes the Tischenko reaction in the presence of aluminum isopropylate to form the di-unsaturated ester 4-pentenyl 4-pentenoate. In the second step, the unsaturated ester is then epoxidized with two moles of an epoxidizing agent such as peracetic acid to form 4,5-epoxypentyl 4,5-epoxypentanoate. While other epoxidizing agents are equally applicable, peracetic acid is preferred.

In a preferred embodiment of this invention, 4-pentenyl 4-pentenoate is prepared by the addition of 4-pentenal to aluminum isopropylate, from about 0.1 to about 20 percent by weight, which has been dissolved in a small quantity of benzene or other suitable solvent, at about 0° C. to 50° C. and preferably from about 10° C. to about 40° C. Other known Tischenko catalysts such as magnesium ethylate can also be used. Depending on the amount of catalyst employed, the reaction mixture is maintained at this temperature for from about 1 to 72 hours, and preferably from about 18 to 72 hours. Upon completion of the reaction, the catalyst is neutralized with acid such as hydrochloric, acetic, and the like and the product is then distilled under reduced pressure to obtain the pure 4-pentenyl 4-pentenoate.

Epoxidation of the ester with peracetic acid or a similar epoxidizing agent to give the diepoxide is carried out between from about 0° C. to about 150° C. and preferably from about 10° C. to about 90° C. Since both double bonds possess about the same reactivity towards peracids, the epoxidation of both double bonds of the ester appears to take place simultaneously. Two or more moles of peracetic acid are added for each mole of the ester and the reaction is allowed to proceed until the approximate theoretical amount of peracetic acid is consumed. This will vary from about one to about eight hours. The theoretical amount of peracetic acid consumed can be determined by titration of the unreacted peroxide. The diepoxidized product can be separated from the acetic acid coproduct by fractionation under reduced pressure, continuous distillation or extraction.

Temperatures employed for the epoxidation of the unsaturated ester may range from about 0° C. to about 150° C. and preferably from about 10° C. to about 90° C. At the lower temperature, the rate of epoxidation is slow and requires extended reaction periods, while at the higher temperatures, further reactions of the epoxide groups may occur. While peracetic acid is the desired epoxidizing agent, other peroxides may be used, for example, perbenzoic acid, monoperphthalic acid, performic acid, hydroperoxides and the like.

Among the polyepoxides for which the compound of this invention is suitable as a reactive diluent are the polyglycidyl ethers formed by reacting epichlorohydrin with polyphenols, such as 2,2-bis(hydroxyphenyl)propane, (Bisphenol A), 1,1,3-tris-(hydroxyphenyl)propane and tetra(hydroxyphenyl)ethane.

4-pentenal, the starting material of this invention, can be prepared in good yield by a series of well-known reactions starting with allyl alcohol and acetaldehyde. By reacting allyl alcohol and acetaldehyde, the diallyl acetal is formed which is then cracked to vinyl allyl ether. Finally, the vinyl allyl ether is rearranged to 4-pentenal (allylacetaldehyde) by heating in the vapor phase at 255° C. The preparation and rearrangement of vinyl allyl ether is described in an article by C. D. Hurd and M. A. Pollack and reported in the Journal of the American Chemical Society, 60 1905 (1938).

The following examples are given by way of illustration and not by way of limitation:

EXAMPLE I

*Preparation of 4-Pentenyl 4-Pentenoate*

A solution consisting of 6 grams (0.03 moles) of aluminum isopropylate and 0.05 grams of trinitrobenzene dissolved in 75 grams of benzene was placed in a 500-ml. flask fitted with a stirrer, thermometer, and dropping funnel. To this stirred solution maintained at 25° C.–30° C. was added, over one hour and thirty minutes, 50 grams (0.595 mole) of 4-pentenal. After the addition, the reaction solution was maintained at 25° C.–30° C. for 16½ hours. The catalyst was then neutralized by the addition of 11 grams of acetic acid and the resulting solution was fractionated on a 9 inch column. 37 grams (74% yield) of 4-pentenyl 4-pentenoate were obtained. Upon purification by redistillation, a sample of 4-pentenyl 4-pentenoate had the following analysis: B.P. 66° C. at 3 mm., N 30/D 1.4362. Calculated for $C_{10}H_{16}O_2$: C, 71.39; H, 9.53. Found: C, 71.76, 71.69; H, 9.67, 9.72.

EXAMPLE II

*Preparation of 4,5-Epoxypentyl 4,5-Epoxypentanoate*

One hundred ninety-three grams (1.15 moles) of 4-pentenyl 4-pentenoate was placed in a two-liter flask fitted with a stirrer, dropping funnel, and thermometer and heated to 35° C. To the stirred contents of the flask was added dropwise over a period of one hour and fifteen minutes 1030 grams of a 25.8% solution of peracetic in acetone (266 grams, 3.5 moles of peracetic acid) while the temperature was maintained at 35° C.–40° C. by external cooling as required. After the addition, the reaction temperature was raised to 45° C.–50° C. and maintained for three more hours. At the end of this period, analysis for peroxide indicated that 100.2% of the theoretical amount of peracetic acid had been consumed, and the reaction solution was then stored for 18 hours at −12° C.

The reaction solution was fed dropwise to a still kettle containing about 1500 grams of ethylbenzene refluxing at 15–20 mm. pressure. During the addition, ethylbenzene, acetic acid, peracetic acid, and acetone were distilled at the head. After addition, the kettle was stripped of low-boiling material and there was obtained 248 grams of residue product which analyzed 79.2% (85.3% yield) as 4,5-epoxypentyl 4,5-epoxypentanoate by determination of epoxide content by the pyridine-hydrochloride method.

The residue product was then flash-distilled from a kettle maintained at 200° C. at 0.3 mm. and there was obtained 215 grams of distillate which was then fractionated on a 6″ packed column to give a 67% yield of distilled 4,5-epoxypentyl 4,5-epoxypentanoate. A fraction of the product, B.P. 106° C. at 0.3 mm. N 30/D 1.4528 analyzed 59.57% carbon and 8.07% hydrogen (theoretical: C, 59.99%; H, 8.07%). The infrared spectrum of this material showed no evidence of carbon-carbon double bonds and was consistent with that expected for the diepoxyester.

The unexpected utility of 4,5-epoxypentyl 4,5-epoxypentanoate as a reactive diluent or viscosity reducer for the diglycidyl ether of 2,2-bis(hydroxyphenyl)propane can readily be seen when compared to its higher homologs. For example, when 20 grams of 4,5-epoxypentyl 4,5-epoxypentanoate were mixed with 80 grams of the diglycidyl ether of 2,2-bis(hydroxyphenyl)propane and a viscosity determination made at room temperature (26° C.) with a Brookfield Viscometer, the mixture had a viscosity of 675 centipoises as compared with 13,900 centipoises for the undiluted diglycidyl ether. A 25 gram portion of the diluted diglycidyl ether of 2,2-bis(hydroxyphenyl)propane was mixed with 10.5 grams of an amine hardener composed of 4 moles diethylenetriamine and 1 mole of the diglycidyl ether of 2,2-bis(hydroxyphenyl)propane in the proportion of 1.2 amine-hydrogen groups per one epoxide group from the epoxy mixture. The resulting mixture formed a gel after standing at room temperature for 30–45 minutes, and after curing for 1.5 hours at 120° C. and then 6 hours at 160° C., there was obtained a tough resin having a heat distortion point of 80° C. and a Barcol hardness of 41. These values compare favorably with an 82° C. heat distortion point and Barcol hardness of 40 for diglycidyl ether of 2,2-bis(hydroxyphenyl)propane diluted with n-butyl glycidyl ether which is used commercially.

In an attempt to prepare a mixture of 20 grams of 9,10-epoxystearyl 9,10-epoxystearate and 80 grams of the diglycidyl ether of 2,2-bis(hydroxyphenyl)propane, it was found that the two compounds were not compatible. Since a homogeneous mixture of the two compounds does not form, 9,10-epoxystearyl 9,10-epoxystearate would be of no value as a reactive viscosity reducer.

It is therefore obvious that the higher homologs such as 9,10-epoxystearyl 9,10-epoxystearate do not have the unique properties which make them useful as reactive diluents or viscosity reducers for the diglycidyl ether of diphenylolpropane.

What is claimed is:

4,5-epoxypentyl 4,5-epoxypentanoate.

References Cited in the file of this patent

UNITED STATES PATENTS

| | | |
|---|---|---|
| 2,458,484 | Terry et al. | Jan. 4, 1949 |
| 2,516,627 | Hearne et al. | July 25, 1950 |
| 2,680,109 | Stevens et al. | June 1, 1954 |
| 2,687,389 | Dazzi | Aug. 24, 1954 |
| 2,698,339 | Hawkins et al. | Dec. 28, 1954 |
| 2,723,247 | Harrington | Nov. 8, 1955 |
| 2,779,771 | Phillips et al. | Jan. 29, 1957 |
| 2,886,472 | Condo et al. | May 12, 1959 |
| 2,935,492 | Newey | May 3, 1960 |